J. H. RAND, Jr.
CARD UNIT FOR INDEX SYSTEMS.
APPLICATION FILED SEPT. 15, 1915. RENEWED JAN. 4, 1917.
1,218,464.  Patented Mar. 6, 1917.
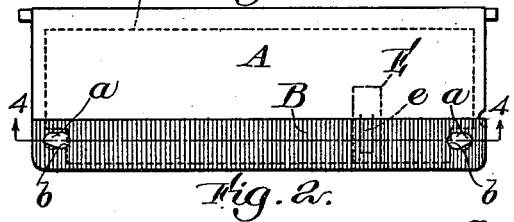
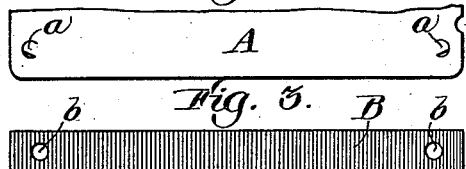
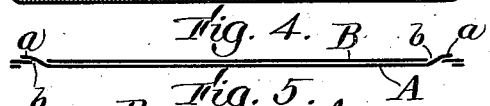
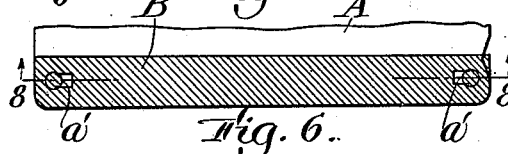
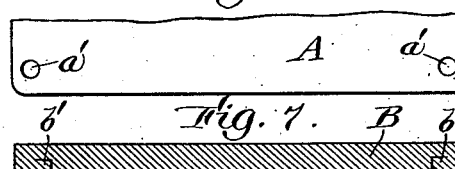
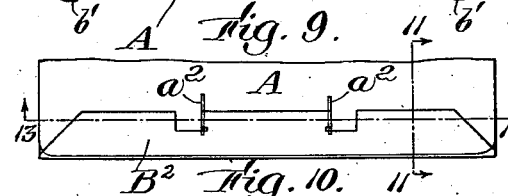
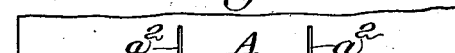
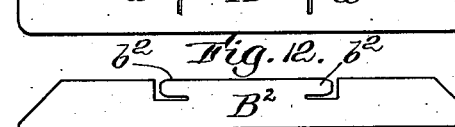
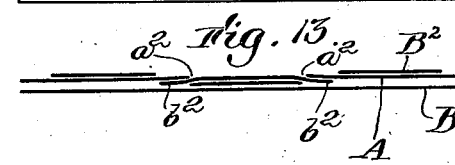
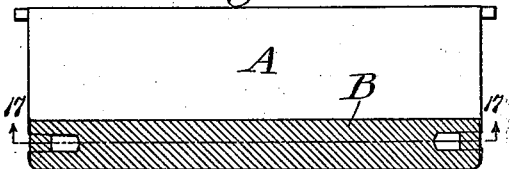
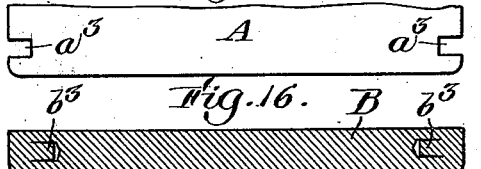
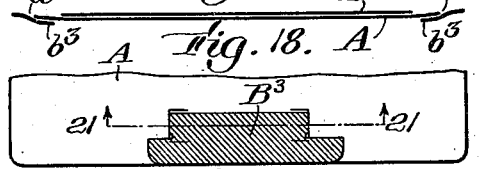
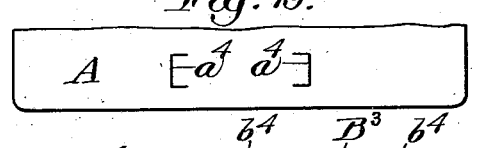
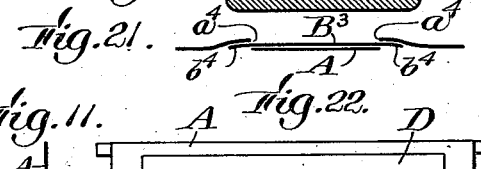
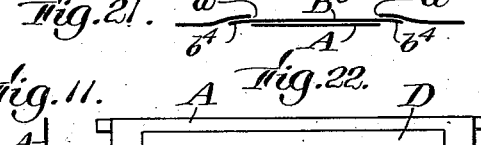
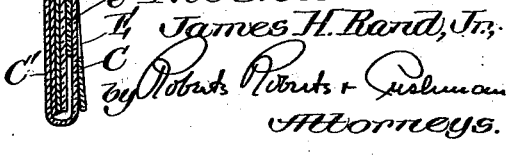
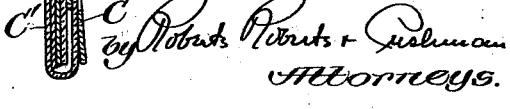
Inventor:
James H. Rand, Jr.
by Roberts, Roberts & Cushman
Attorneys.

UNITED STATES PATENT OFFICE.

JAMES H. RAND, JR., OF NORTH TONAWANDA, NEW YORK.

CARD UNIT FOR INDEX SYSTEMS.

1,218,464.     Specification of Letters Patent.    Patented Mar. 6, 1917.

Application filed September 15, 1915, Serial No. 50,891. Renewed January 4, 1917. Serial No. 140,576.

*To all whom it may concern:*

Be it known that I, JAMES H. RAND, Jr., a citizen of the United States, and resident of North Tonawanda, in the county of Niagara and State of New York, have invented new and useful Improvements in Card Units for Index Systems, of which the following is a specification.

This invention relates to card units for card index systems of the overlapping card type, and consists primarily in providing some or all of the cards in the system with a detachable cover or sheath of transparent sheet material superposed on the face of the card, either for protection of the margin of the card which receives the greatest wear in handling, or for the purpose of a signal, or both. The detachable sheath is also secured to the card in such manner that it constitutes a pocket for holding a removable card or paper insert. These and other features will be hereinafter more fully described and particularly pointed out in the claims. Throughout the specification and claims the term "card" is used to denote any sheet of suitable material and is not to be construed in the limited sense of a sheet of comparatively thick pasteboard.

In the accompanying drawings which illustrate several modifications of the invention,—

Figure 1 is a face view of a card and its removable sheath containing the invention;

Fig. 2 is a detail of the lower part of the card without the sheath;

Fig. 3 is a face view of the sheath removed from the card;

Fig. 4 is a section on line 4—4 of Fig. 1;

Fig. 5 is a face view of part of a card and sheath embodying the invention in a different form;

Fig. 6 is a face view of the lower part of the card shown in Fig. 5;

Fig. 7 is a face view of the sheath shown in Fig. 5;

Fig. 8 is a section on line 8—8 of Fig. 5;

Fig. 9 is a face view of part of a card and sheath containing another modification;

Fig. 10 is a face view of part of the card shown in Fig. 9;

Fig. 11 is a section on line 11—11 of Fig. 9;

Fig. 12 is a face view of the sheath shown in Fig. 9;

Fig. 13 is a section on line 13—13 of Fig. 9;

Fig. 14 is a face view of a card and removable sheath containing another modification;

Fig. 15 is a detail of part of the card shown in Fig. 14;

Fig. 16 is a face view of the sheath shown in Fig. 14;

Fig. 17 is a section on line 17—17 of Fig. 14;

Fig. 18 is a face view of part of a card and sheath containing another modification;

Fig. 19 is a face view of part of the card shown in Fig. 18;

Fig. 20 is a face view of the sheath shown in Fig. 18;

Fig. 21 is a section on line 21—21 of Fig. 18;

Fig. 22 is a face view of another form of the invention containing also a secondary or additional signal;

Fig. 23 is a perspective view of the removable sheath shown in Fig. 22;

Fig. 24 is a detail of the secondary signaling device shown in Fig. 22; and

Fig. 25 is an enlarged section on line 25—25 of Fig. 22.

Referring first to Figs. 1 to 4: A represents the card which may in its general characteristics be of usual form. B represents the sheath or cover which is preferably made of transparent sheet celluloid and may be of any desired color. The sheath is of smaller area than the card and in the form now under discussion covers the lower margin of the card which is the margin exposed when a series of similar cards are mounted in a frame in overlapping relation. The sheath B is detachably secured to the margin of the card A by means of mutually engaging tongues and sockets. The card A is provided with a pair of tongues *a* cut from the body of the card and extending outwardly, and the sheath B is provided with a pair of complementary holes *b*. In order to attach the sheath to the card the latter is bent sufficiently to shorten the distance between the tongues *a*, and the tongues are then inserted into the sockets *b*, whereupon the card A is again allowed to spring back into flat position, with the tongues interlocked with the sockets.

The sheath B is open at its upper or inner edge so that it provides a pocket within which an additional card or paper insert D may be placed. Thus the indexed matter may be either written on the card A, or on a removable insert D, in which case the card A will usually be kept for a holder for the information-bearing card D.

The sheaths may be of uniform or variously classified colors thus serving as signals according to any prearranged plan appropriate to the subject-matter of the card index, such as signals to indicate changes in the statement of an account, the class or character of entries upon the card, etc.

In the form of the invention shown in Figs. 5 to 8, the socket members of the mutually engaging tongues and sockets are shown at $a'$ in the card A, while the tongues are shown at $b'$ in the sheath B. The tongues $b'$ also extend inwardly instead of outwardly; otherwise the construction and use of the cards and sheaths is the same as in the form first described.

In the form shown in Figs. 9 to 13 the card A is made with a pair of vertical slots $a^2$, and the sheath $B^2$ is made with a pair of outwardly extending tongues $b^2$ cut from the face of the sheath as shown in Fig. 12, for engaging the sockets $a^2$. The sheath $B^2$ in this modification is also folded around the lower edge of the card A as shown at $B'$ (Fig. 11) so that the sheath protects both the front and back margins of the card but is still readily removable from the card. In the construction shown in Fig. 9 the sheath is divided into three pockets separated by the slots $a^2$ into which pockets small inserts can be placed. If it should be desired to have merely one pocket with the form of tongues and slots now under consideration, the tongues would be cut from the ends of the face of sheath B and the slots $a^2$ correspondingly positioned farther apart in the card.

In the form shown in Figs. 14 to 17, the sheath B is substantially similar to that shown in Figs. 5 and 7 having inwardly extending tongues $b^3$, while the sockets in the card A consist of slots or notches $a^3$ cut in from the side edges of the card.

In the form shown in Figs. 18 to 21, the sheath covers only part of the card margin, being much shorter than the width of the card. The sheath $B^3$ is provided with tongues $b^4$ which are inserted into complementary slots $a^4$ of the card A. In this form the sheath may be placed on any desired part of the card margin which receives the greatest wear in handling, and by the use of colored celluloid for the sheath it may serve as a signal in the same manner as in the other forms.

In the form shown in Figs. 22 to 25, the card A is provided with a permanently attached sheath or pocket C preferably made of white or colorless transparent celluloid overlying the lower margin of the face of the card and extending around the lower edge of the card as shown at $C'$. The sheath C is secured to the card A by any suitable means as by a pair of rivets or eyelets $c$. The removable sheath $B^4$ is inserted within the pocket formed by the fixed sheath C in front of the insert D when the latter is used. As an additional signal for indicating secondary information or classification, according to the subject-matter of the card, I provide the indicator E having a tongue $e$ which engages the edge of the sheath C and is adjustable lengthwise thereon. It will be understood that the secondary signal E might also be applied to the removable sheath of any of the forms, as indicated in Fig. 1.

The signal E is preferably made of transparent sheet celluloid of some color contrasting with the color of the sheath or sheaths, so that although conspicuous it will not obscure matter underneath. Said signal E might be made of other materials either transparent or opaque, without departing from the invention.

I claim:

1. A card for a card index system, and a sheath of transparent sheet material superposed on the face of the card, said card and sheath being provided with mutually engaging tongues and sockets by which the sheath is detachably secured to the card.

2. A card for a card index system, and a sheath of transparent sheet material superposed on the face of the card and detachably secured thereto, said sheath being open at one edge at least to form a pocket for an insert between the card and the sheath.

3. A card for a card index system, and a sheath of transparent sheet material superposed on the face of the card, said card and sheath being provided with mutually engaging tongues and sockets by which the sheath is detachably secured to the card, said sheath being open at one edge at least to form a pocket for an insert between the card and the sheath.

4. A card for a card system, and a sheath of transparent sheet material of smaller area than the card, superposed on the face of the card, covering part of the card and leaving part uncovered, said sheath being detachably secured to the card.

5. A card for a card system, and a sheath of transparent sheet material of smaller area than the card, superposed on the face of the card, covering part of the card and leaving part uncovered, said card and sheath being provided with mutually engaging tongues and sockets by which the sheath is detachably secured to the card.

6. A card for a card system, and a sheath of transparent sheet material of smaller area than the card, superposed on one margin of the card, said sheath being detachably secured to said margin of the card.

7. A card for a card system, and a sheath of transparent sheet material of smaller area than the card, superposed on one margin of the card, and said card and sheath being provided with mutually engaging tongues and sockets by which the sheath is detachably secured to the margin of the card.

8. A card for a card system, and a sheath of transparent sheet material of smaller area than the card, superposed on one margin of the card and open at its inner edge to form a pocket for an insert between the card and the sheath.

9. A card for a card system, and a sheath of transparent sheet material superposed on one margin of the card and folded around the edge of said margin, said sheath being detachably secured to the card margin and open at its inner edge to form a pocket for an insert between the card and the sheath.

10. A card for a card index system, and a sheath of transparent sheet material superposed on one margin of the card, said sheath being open at its inner edge to form a pocket, and a signal member adjustably mounted on said sheath.

Signed by me at North Tonawanda, New York, this eleventh day of September 1915.

JAMES H. RAND, Jr.

Witnesses:
 FRED'K ROBERTSON, Jr.,
 LAWRENCE H. GESER.